United States Patent
Rover, Jr.

[11] 3,824,535
[45] July 16, 1974

[54] HEAD-UP DISPLAY APPARATUS INCLUDING MEANS FOR DISPLAYING THREE DIMENSIONAL AIRCRAFT VERTICAL PATH LINE

[75] Inventor: Ralph R. Rover, Jr., Cresskill, N.J.

[73] Assignee: The Bendix Corporation, Teterboro, N.J.

[22] Filed: Sept. 28, 1972

[21] Appl. No.: 293,221

[52] U.S. Cl............................................ 340/27 NA
[51] Int. Cl................................................ G08g 5/00
[58] Field of Search......... 340/27 R, 27 AT, 27 NA; 350/96 B; 343/108 SM

[56] References Cited
UNITED STATES PATENTS

| | | |
|---|---|---|
| 3,230,819 | 1/1966 | Noxon............................ 340/27 NA |
| 3,247,755 | 4/1966 | Siegmund........................ 350/96 B |
| 3,648,232 | 3/1972 | White.............................. 340/27 R |
| 3,711,826 | 1/1973 | Russa.............................. 340/27 NA |

Primary Examiner—Kathleen H. Claffy
Assistant Examiner—Thomas L. Kundert
Attorney, Agent, or Firm—Anthony F. Cuoco; S. H. Hartz

[57] ABSTRACT

In combination with head-up display apparatus for displaying aircraft navigational symbology to the pilot of the craft as a real world infinity overlay, means for displaying a three dimensional aircraft vertical path line appearing to the pilot to extend from a point just forward of the craft on out to infinity.

8 Claims, 8 Drawing Figures

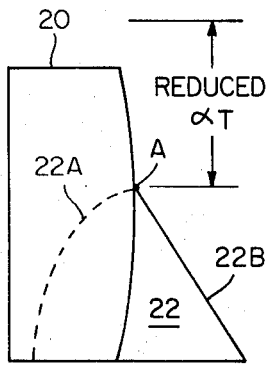
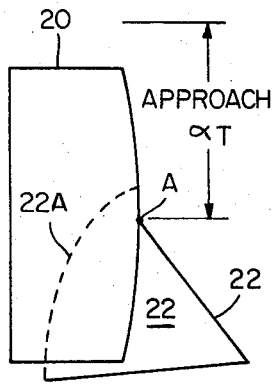
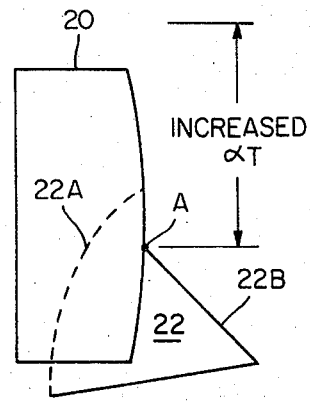
FIG. 4A  FIG. 4B  FIG. 4C
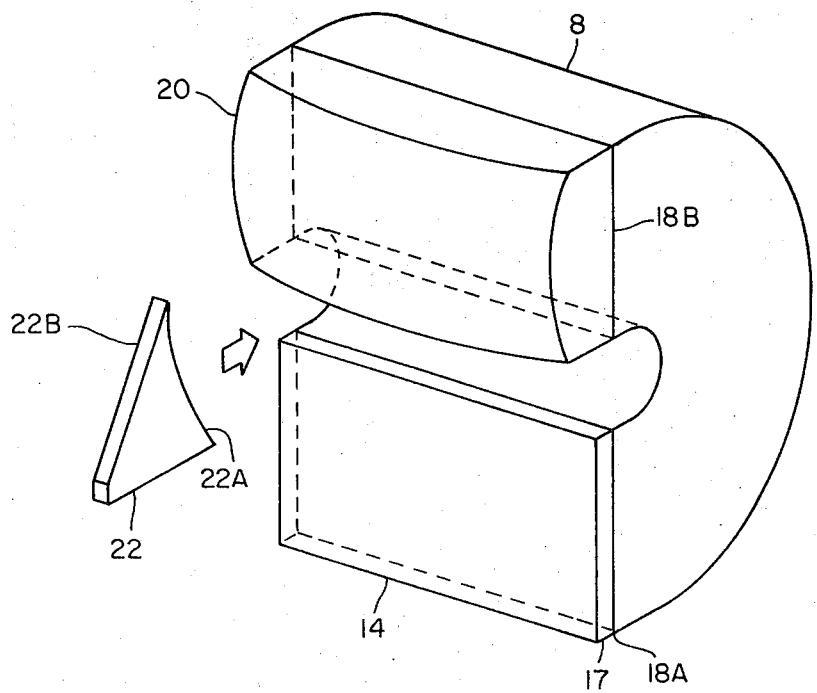
FIG. 5

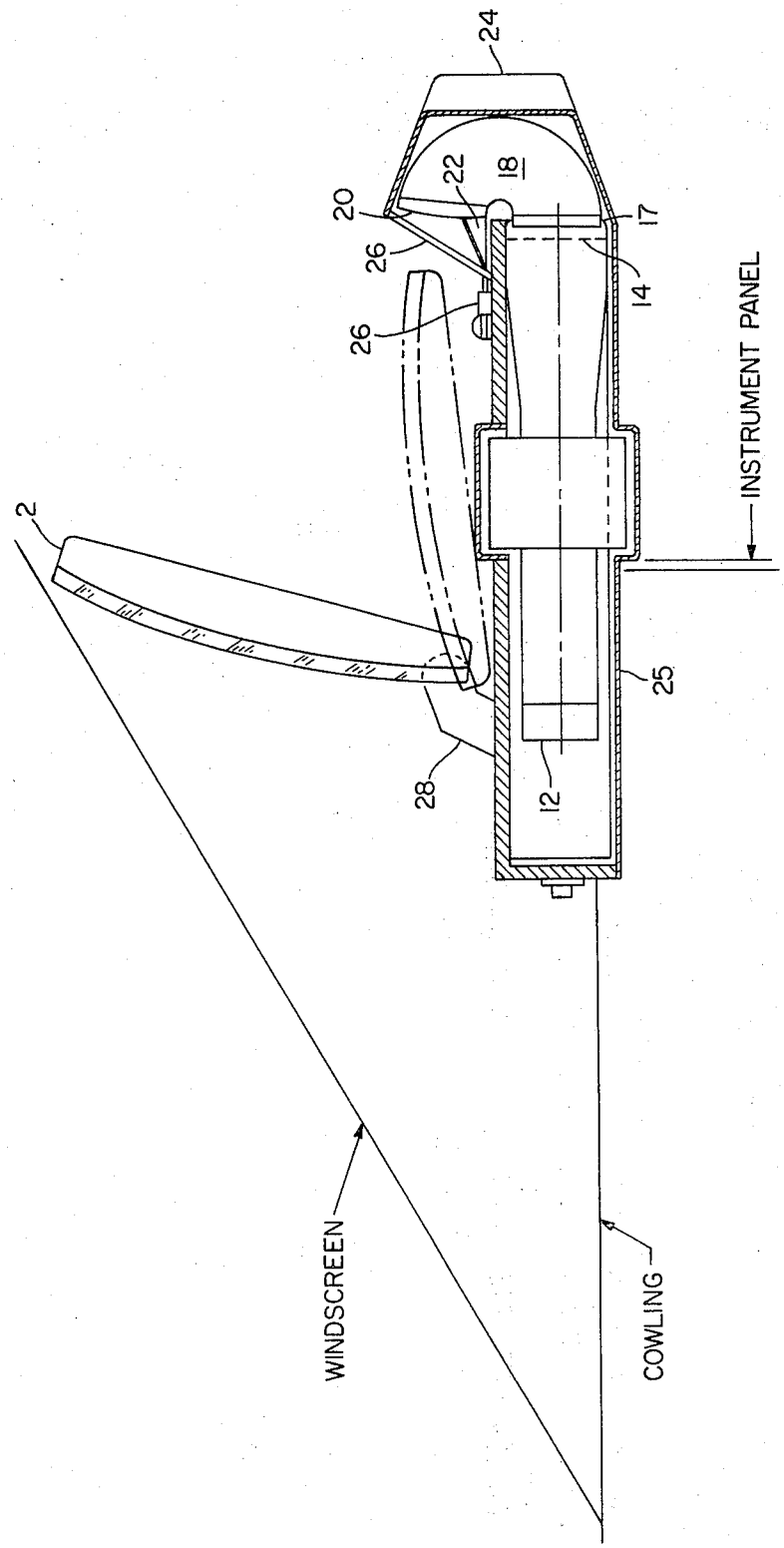

HEAD-UP DISPLAY APPARATUS INCLUDING MEANS FOR DISPLAYING THREE DIMENSIONAL AIRCRAFT VERTICAL PATH LINE

CROSS-REFERENCE TO RELATED APPLICATION

This invention may be used with the low profile fiber optics head-up display apparatus disclosed and claimed in copending U.S. application Ser. No. 293,219, filed Sept. 28, 1972 by Ralph R. Rover, Jr. and assigned to The Bendix Corporation assignee of the present invention.

BACKGROUND OF THE INVENTION

1. Field of the Invention

This invention relates to head-up display apparatus for displaying aircraft navigational symbology and, more particularly, for displaying most of the symbology as a real world infinity overlay and for displaying an aircraft vertical path line which appears an aircraft vertical path line which appears to the pilot of the craft to extend from a location just forward of the craft to a location out at infinity.

2. Description of the Prior Art

Head-up display apparatus is used for displaying aircraft navigational symbology generated on the face plate of a cathode ray tube to the pilot as a real world infinity overlay. In order to assist the pilot in landing the craft it is desirable to display a line indicative of the vertical path of the craft and appearing to extend from a point just forward of the craft to a point at infinity.

SUMMARY OF THE INVENTION

This invention contemplates head-up display apparatus having a spherical combiner and fiber optics components including a cathode ray tube face plate, an image conduit and a focal contour element. The cathode ray tube face plate transfers symbology generated by the cathode ray tube from the phosphor plane of the tube to the outer face plate surface. The image conduit which is U-shaped has an input surface disposed in intimate contact with the face plate outer surface and transmits the symbology away from the face plate and through a vertical rotation of, for example, approximately 170°, into alignment with the optical axis of the spherical combiner. The contour element is disposed in intimate contact with the output surface of the image conduit and has a curved output surface, and serves as a secondary image conduit by further transmitting the generated symbology to its output surface which is disposed at the focal surface of the combiner to provide a real world infinity overlay display. A fiber optics wafer is arranged in relation to the contour element and the combiner for transmitting a vertical path line generated by the cathode ray tube to the combiner, and which line appears to the pilot to extend from a point just forward of the craft to a point at infinity.

One object of this invention is to provide a head-up display system for displaying aircraft navigational symbology as a real world infinity overlay and for displaying an aircraft vertical path line appearing to extend from a point just forward of the craft to a point at infinity.

Another object of this invention is to provide a device of the type described using fiber optics components to avoid costly and bulky optical elements.

Another object of this invention is to provide the vertical path line so that it remains fixed in azimuth relative to the aircraft but varies in length and vertical position.

Another object of this invention is to provide the vertical path line so that it is three dimensional in character.

The foregoing and other objects and advantages of the invention will appear more fully hereinafter from a consideration of the detailed description which follows, taken together with the accompanying drawings wherein two embodiments of the invention are illustrated by way of example. It is to be expressly understood however, that the drawings are for illustration purposes only and are not to be construed as defining the limits of the invention.

DESCRIPTION OF THE DRAWINGS

FIGS. 4A, 4B and 4C are diagrammatic representations showing typical positions of the vertical path line display means which is moveable in accordance with FIG. 3.

FIG. 5 is a diagrammatic representation showing a feature of the invention whereby the vertical path line display means is stationary.

FIG. 6 is a side view outline drawing showing an implementation of the invention.

DESCRIPTION OF THE INVENTION

Apparatus for generating runway images on cathode ray tube plates is well known in the art. Such apparatus is described in U.S. Pat. No. 3,345,632 issued Oct. 3, 1967 to Ralph R. Rover, Jr. inventor of the present invention and in U.S. Pat. No. 3,305,865 issued Feb. 21, 1967 to John H. Gassler, both of which patents are assigned to the Sperry Rand Corporation. Typical symbology so generated is shown by way of example in FIG. 1 and as reflected on a spherical combiner 2 which is part of the present invention. Shown are a horizon line 4, a flight path angle scale 6 and a touchdown point 8 on a runway 10. The horizon line, touchdown point and flight path scale are fully pitch and roll stablized having a 1—1 relationship with the real world.

Additionally, means are provided for displaying a vertical path line 11 which is focused in the optical system to appear, for example, approximately 8 feet away at the near end and extending to infinity at the far end. The angular position of the far end of vertical path line 11 is always coincident with touchdown point 8. In one implementation of the invention the vertical path line display means is moveable and in another implementation, which is a compromise between complexity and total three dimensional realism as the flight angle of the aircraft varies during a typical runway approach, said means is stationary. This latter effect is bearly noticeable to the pilot of the craft during a normal runway approach since the effect of parallx which is a result thereof diminishes drastically as the distance increases.

It is noted that spherical combiner 2 is used as a spherical reflector to both optically project and combine symbology generated by the cathode ray tube with the pilots view of the rear world. It provides a rectangular viewing aperture offering an instantaneous field of view coverage of the real world and amounting, for purposes of illustration, to 12° vertical by 24° horizontal. The optical axis of symmetry is boresighted to an axis 8° below the horizon line optimizing the accuracy during approach and landing. The 12° vertical field of view provides coverage having boundaries of −1° and −13° relative to the aircraft fuselage reference line.

The aforenoted coverage angles have been set up for a particular illustrative example and may be modified for each specific installation, whereby the instantaneous field of view and the boresight angle are changed.

Figure 2:
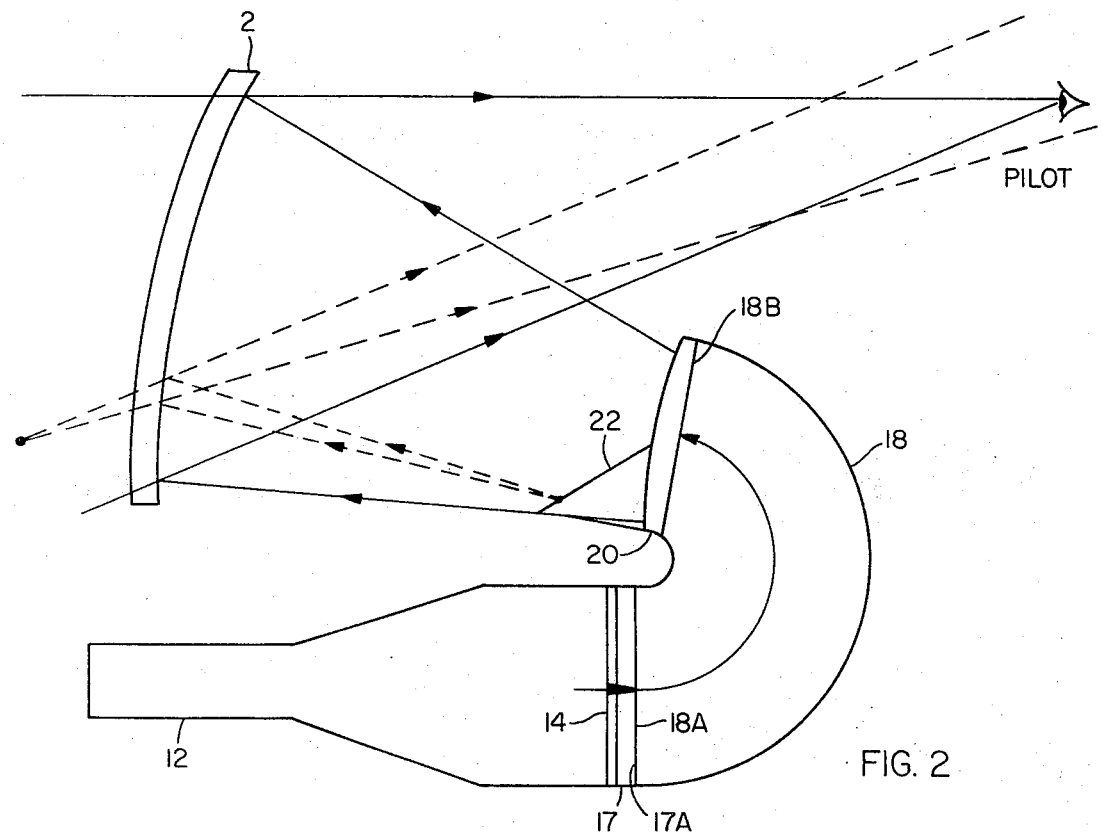
FIG. 2 is an optical schematic diagram showing the components of the invention.

The specific arrangement of the elements of the invention is shown in FIG. 2. Thus, as explained in the aforenoted U.S. application Ser. No. 293,219, a low profile head-up display apparatus is provided having an extremely shallow vertical profile for enabling installation atop an aircraft instrument panel without interfering with primary instrument space. To this end a cathode ray tube 12 has a phosphor surface 14 and a fiber optics face plate 17 is arranged in alignment with a U-shaped image conduit 18 and a fiber optics contour element 20.

Face plate 17 transfers the generated symbology from phosphor surface 14 to the outer face plate surface 17A. Image conduit 18 has an input end 18A positioned in intimate contact with face plate outer surface 17A and an output end 18B positioned in intimate contact with contour element 20. The image conduit transmits the symbology from the face plate and through a vertical rotation, which may be 170° as heretofore noted, into alignment with the input surface of contour element 20.

Contour element 20 has a curved output surface and serves as a secondary image conduit by further transmitting the symbology to its output surface which is positioned at the focal surface of combiner 2. The contour curvature matches the combiner curvature of field allowing the projected display image to be focused at infinity without the use of costly optical elements.

Figure 1:
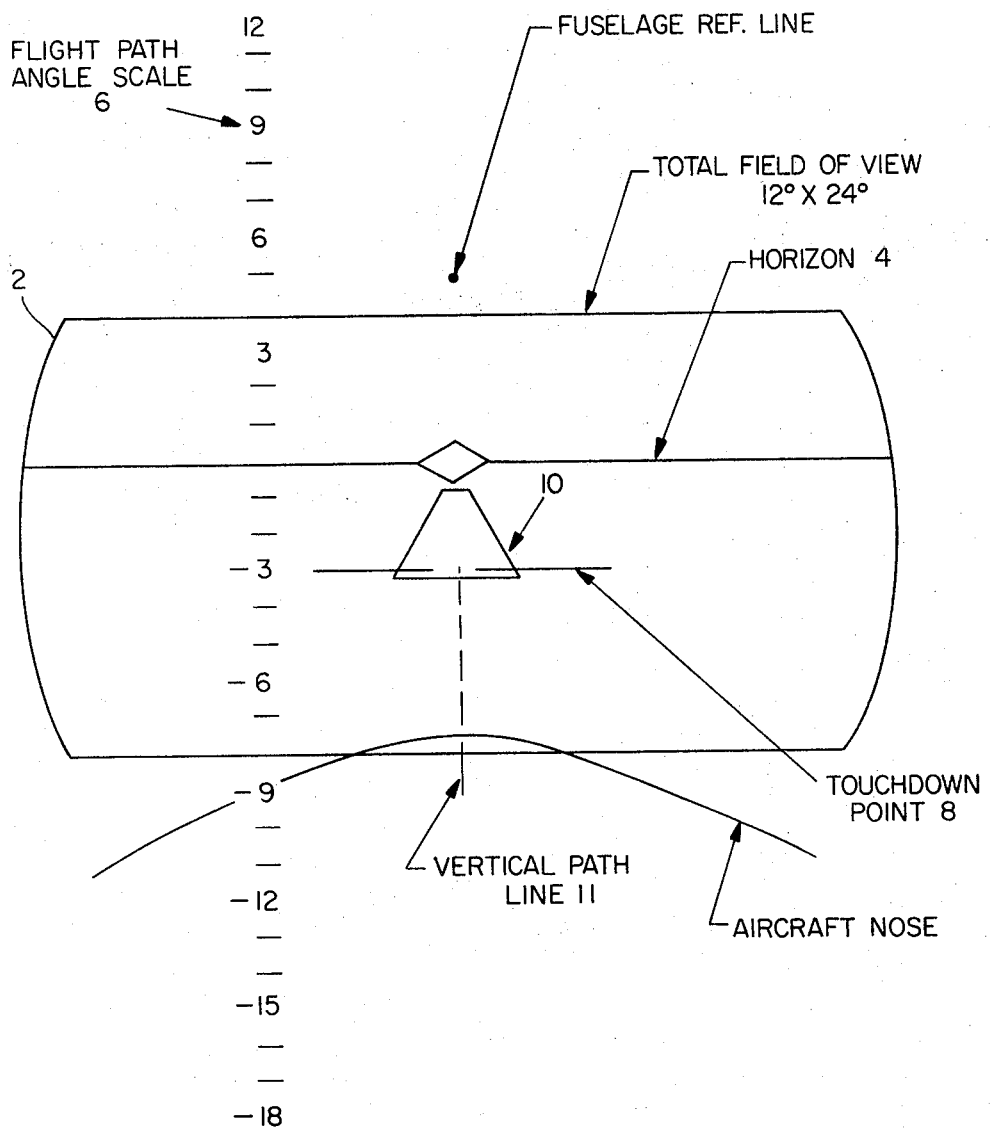
FIG. 1 is a graphical representation showing typical symbology to be displayed by the system of the invention, when landing the aircraft.

Additionally, a three dimensional fiber optic wedge or wafer 22 having a thin triangular shape is arranged in contact with the contour surface of contour element 20 so that the hypotenuse of the triangle faces combiner 2. Vertical path line 11 generated by cathode ray tube 12 and as shown in FIG. 1 is transmitted by wedge 22 from the contour surface to a location between the focal surface of contour element 20 and the combiner surface of combiner 2. The sloping nature of the output surface of fiber optics wafer 22 provides a focal plane displacement which varies with slope position. Thus, the optical projection as seen by the pilot is a virtual image which extends from infinity to a location approximately 8 feet forward of the pilot's eye location. When landing the aircraft the other display elements contained within the focal surface are not affected by fiber optics wafer 22 and the symbology projected thereby appears as an infinity overlay of the real world as would otherwise be the case.

The construction of fiber optical components such as face plate 17, image conduit 18, focal contour element 20 and wafer 22 is well known in the art. Face plate 17 for example is constructed of a group of relatively short, fused optical fibers whose axes are arranged perpendicular to the image surface. Used as image transports, face plates are nearly equivalent to a zero thickness window. Focal contour element 20 is of similar construction except that it has a contoured face for purposes heretofore described. Likewise, wafer 22 is similar in construction to face plate 20 and contour element 22 except that is is triangular in shape as heretofore noted. Image conduit 18 is a coherent bundle of fibers bent to the desired radius.

The construction of fiber optics components as used in the invention is described in the Bendix Technical Journal, Volume 2, Number 2, Summer 1969, published by The Bendix Corporation, Southfield, Mich.

Figure 3:
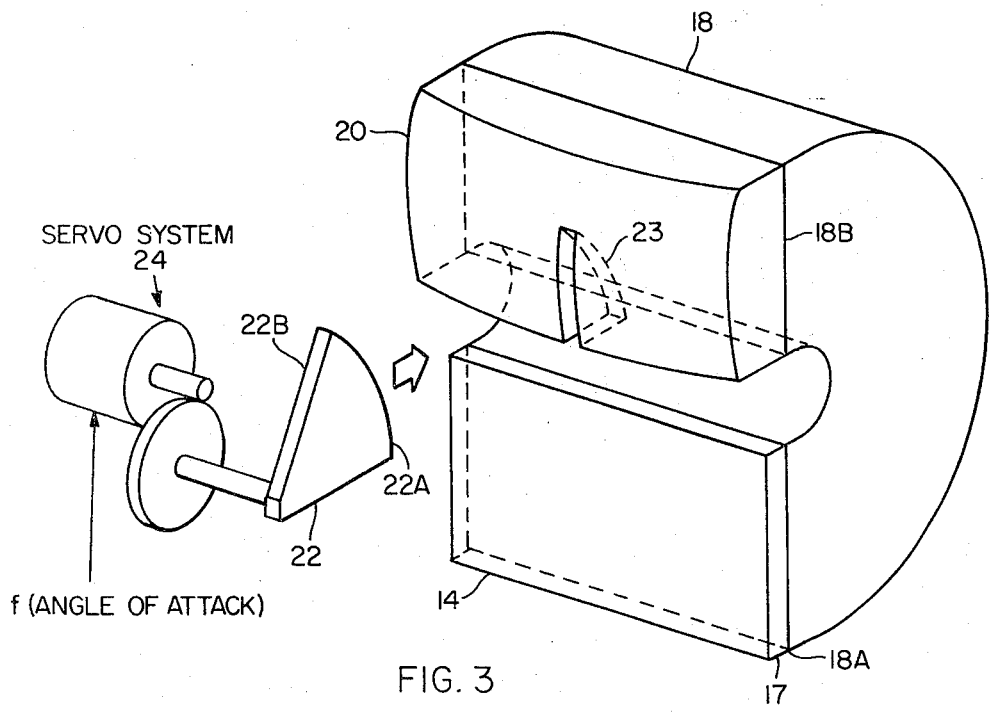
FIG. 3 is a pictorial representation illustrating a feature of the invention whereby the vertical path line display means is moveable.

Reference is now made to FIG. 3 which shows an embodiment of the invention wherein fiber optics wafer 22 is moveable. It will be understood that images developed on phosphor surface 14 of cathode ray tube 12 (FIG. 2) are transferred via fiber optics face plate 17, image conduit 18 and focal contour element 20. This results in all images on the focal surface of the system being collimated (focused at infinity) by combiner 2 (FIG. 2). Vertical path line 11 appears on the internal arc surface of a cut 23 provided for wafer 22. The wafer is servoed by a servo system 24 as a function of true angle of attack ($\alpha_T$) of the aircraft. Wafer 22, in turn, picks up the image on its mating surface 22A and transfers the image to its output surface 22B. The resulting line as seen by the pilot appears to extend to a point approximately 8 feet forward on out to infinity at the far end as shown in FIG. 1.

Three typical positions of fiber optic wafer 22 for projecting vertical path line 11 are shown in FIGS. 4A, 4B and 4C respectively. Thus the nominal position of wafer 22 during runway approach is shown in FIG. 4B. Variations in the position of wafer 22 for a reduced angle of attack and for an increased angle of attack are shown in FIGS. 4A and 4C, respectively.

In this connection it is to be noted that the position of the far end of vertical path line 11 corresponding to the intersection of the contour surface of focal element 20 and wafer output surface 22B (point A in FIGS. 4A, 4B, and 4C) necessitates an approximately positioned cathode ray tube image of line 11. Approximately ±3° to 4° of variation may be accommodated using the described implementation, which would be adequate for normal runway approaches. Motion beyond this range would be indicated by a correctly positioned touchdown point 8 shown in FIG. 1.

Due to the complexity and corresponding additional size, weight and cost of implementing a moveable wafer 22 as shown in FIG. 3 for achieving the result shown in FIGS. 4A, 4B and 4C, a compromise approach using a fixed wafer 22 is illustrated in FIG. 5. Thus, vertical path line 11 (FIG. 1) is projected so that during a normal runway approach the line would appear to meet touchdown point 8 at runway 10. As variations in approach are made, line 11 would appear to extend on the infinity plane or to be foreshortened. Always, however, the perceived angular position of the far end of line 11 is coincident with the angular position of touchdown point 8. Touchdown point 8 would be the primary image to be used by the pilot to evaluate his touchdown position, while line 11 would be used primarily to control his speed along the flight path, particularly during a cross wind condition. In the embodiment of the invention shown in FIG. 5 a cut out for receiving fiber optical wafer 22 is not employed and input surface 22A of wafer 22 is positioned in intimate contact with the contour surface of focal element 20.

FIG. 6 is an implementation of the device of the invention, wherein the head-up display system is mounted atop a typical instrument panel without interfering with primary instrument space as explained in the aforenoted U.S. application Ser. No. 293,219. Thus, cathode ray tube 12 having phosphor surface 14, fiber optics face plate 17, image conduit 18, contour element 20 and fiber optic wafer 22 are mounted within a suitable housing or casing 25. The arrangement is such that conduit 18 is in contact with face plate 17 at its input end and with contour element 20 at its output end. The front of casing 25 carries a bumper element 24 for protecting conduit 18 and the pilot of the craft. A cover glass 26 is affixed to casing 25 behind contour element 20 and wafer 22. Combiner 2 is pivotally mounted on a bracket 28 attached to frame 25 so that the combiner folds down to an out-of-view position as shown in the figure.

A handle 26 is mounted to frame 23 and supports fiber optics wafer 22 in intimate contact with conduit 18. Handle 26 is arranged so that, for example, rotation of the handle in a counterclockwise direction will remove wafer 22 from the optical system as may be desired when vertical flight path 11 is not required and rotation in a clockwise direction brings wafer 22 within the optical system.

Although several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. Low profile head-up display apparatus for displaying an image including aircraft navigational symbology and an aircraft vertical path line to the pilot of the craft, comprising:

means for generating the image including a cathode ray tube with a phosphor plane on which the image is generated, and a face plate having an outer surface and an inner surface adjacent the phosphor plane for transferring the image to said outer surface;

a curved combiner which is viewed by the pilot;

means disposed between the image generating means and the combiner for transmitting the image away from the generating means and for rotating said image into alignment with the optical axis of the combiner including a U-shaped image conduit having an input surface disposed in intimate contact with the face plate outer surface and rotating the symbology at the outer surface to a conduit outer surface in alignment with the optical axis of the combiner;

means arranged with the transmitting and rotating means for transmitting the aircraft navigational symbology to the combiner so that said symbology appears as a real world infinity overlay including a contour element having an input surface disposed in intimate contact with the conduit outer surface and a curved output surface;

means arranged with the transmitting means for transmitting the vertical path line to the combiner so that said line appears to extend from a point just forward of the craft to a point at infinity including a wedge having an input surface which is curved to match the curved output surface of the contour element and is in intimate contact therewith, and a sloping output surface.

2. Apparatus as described by claim 1, wherein:

the contour element has an input surface disposed in intimate contact with the conduit output surface and a curved output surface; and the contour element transfers the symbology from its input surface to its curved output surface.

3. Apparatus as described by claim 1, wherein:

the curvature of the contour element matches the curvature of the combiner for focusing the symbology at infinity.

4. Apparatus as described by claim 1, wherein:

the curved output surface has a slot for receiving the curved input surface of the wedge.

5. Apparatus as described by claim 4, including:

means coupled to the wedge for displacing the wedge within the slot as a function of angle of attack of the aircraft.

6. Apparatus as described by claim 1, wherein:

the means for generating the image, the means disposed between the image generating means and the combiner for transmitting the image away from the generating means and for rotating said image into alignment with the optical axis of the combiner, the means arranged with the transmitting and rotating means for transmitting the aircraft navigational symbology to the combiner so that said symbology appears as a real world infinity overlay, and the means arranged with the transmitting means for transmitting the vertical path line to the combiner so that said line appears to extend from a point just forward of the craft to a point at infinity are arranged within a housing disposed atop the aircraft instrument panel; and the combiner is supported by the housing and external thereto, and in optical arrangement with all of said means.

7. Apparatus as described by claim 6, wherein:

the combiner is pivotally supported by the bracket so as to be pivotable to an out-of-view position.

8. Apparatus as described by claim 6, including:

handle means for supporting the last mentioned means within the housing and operable for selectively removing said means from the optical arrangement and for replacing said means in the arrangement.

* * * * *